Oct. 10, 1961 K. J. KNUDSEN 3,004,222
COMPACT ELECTRICAL INSTRUMENT MOVEMENT WITH
LARGE-SCALE DEFLECTION AND SELF-SHIELDING
FIELD STRUCTURE
Filed July 16, 1958 2 Sheets-Sheet 1
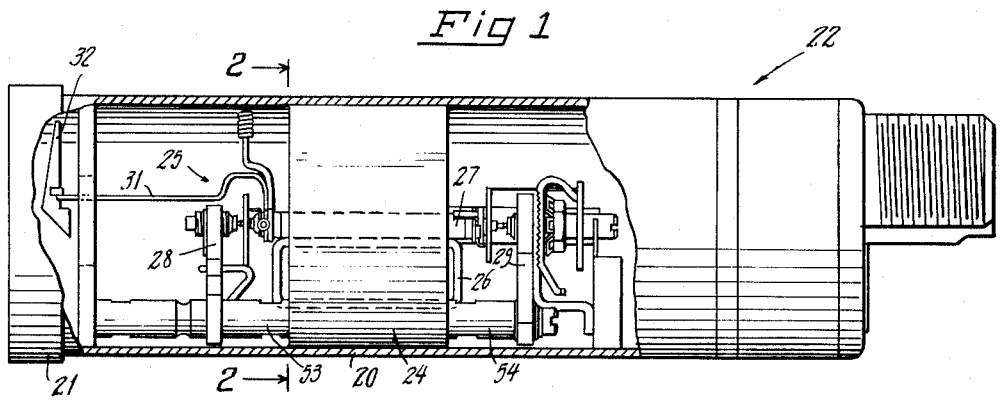
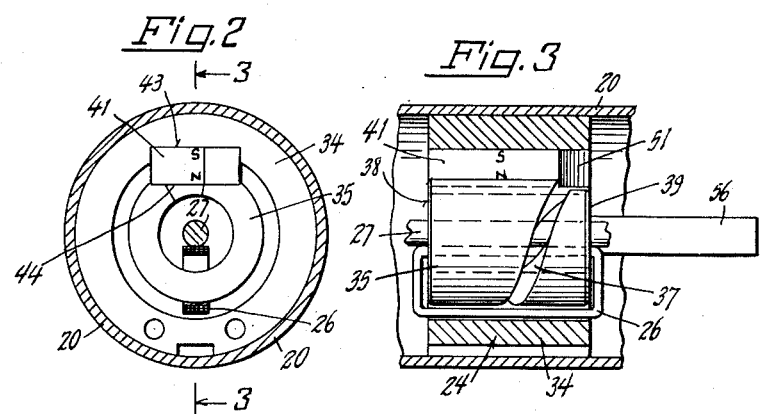
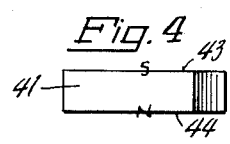
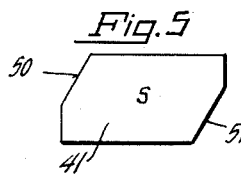
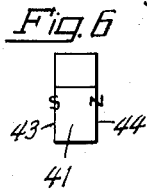
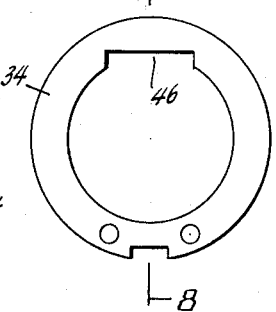
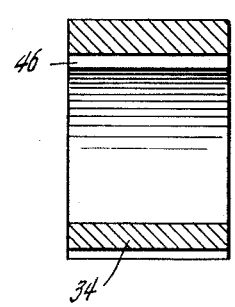
INVENTOR.
Knud J. Knudsen
BY
H Gibner Lehmann
AGENT Oct. 10, 1961 K. J. KNUDSEN 3,004,222
COMPACT ELECTRICAL INSTRUMENT MOVEMENT WITH
LARGE-SCALE DEFLECTION AND SELF-SHIELDING
FIELD STRUCTURE
Filed July 16, 1958 2 Sheets-Sheet 2

INVENTOR.
Knud J. Knudsen
BY
H. Gibner Lehmann
AGENT

United States Patent Office 3,004,222
Patented Oct. 10, 1961

3,004,222
COMPACT ELECTRICAL INSTRUMENT MOVE-MENT WITH LARGE-SCALE DEFLECTION AND SELF-SHIELDING FIELD STRUCTURE
Knud J. Knudsen, Middlebury, Conn., assignor to Lewis Engineering Company, Naugatuck, Conn., a corporation of Connecticut
Filed July 16, 1958, Ser. No. 748,928
4 Claims. (Cl. 324—150)

This invention relates to electrical instrument movements of the D'Arsonval type employing permanent magnet field structures, and more particularly to the interacting magnetic structures of such instruments.

It has been heretofore proposed to provide, and there have been produced various moving-coil type electrical instruments utilizing permanent magnet field structures, wherein the moving coil assemblage could be entirely removed from the field structure without disassembling the pole pieces or other essential or basic components of the latter, and therefore without disturbing the magnetic circuit.

An illustration of an instrument constructed with this feature may be found, for example, in my Patent No. 2,391,168 entitled "Electrical Ratio Meter," and my Patent No. 2,586,831 entitled "Movable Coil Electrical Instrument." In the earlier of these two patents there was revealed a ratio meter wherein the coil assemblage could be removed without dismantling the field magnet structure, and wherein the extent of deflection of the movable coil assemblage was in the neighborhood of 45 degrees on each side of an electrically centered position.

In my later patent identified above there is disclosed an improved movable-coil instrument of the ratio meter type, wherein the feature of easy removability of the movable coil assemblage was provided with a deflection characteristic greatly in excess of 90 degrees and even as great as 300 degrees or more.

The present invention is directed toward the provision of such movable-coil type electrical instrument movements wherein a large range of deflection is possible, greatly in excess in 90 degrees and approaching 270 degrees, while still retaining easy removability of the movable coil assemblage without disturbing the permanent magnet field structure or the magnetic circuit thereof. The invention is further especially concerned with electrical instrument movements as thus characterized, which are adaptable for fabrication in very small sizes, as for example sizes enabling the entire instrument movement to be contained within an elongate cylindrical casing having a diameter on the order of 1 inch, and which exhibit very small leakage flux at their exteriors whereby they will not adversely affect adjoining equipment.

Accordingly one object of the present invention is to provide a novel and improved electrical instrument movement of the movable coil type having a permanent magnet field structure, wherein an extremely small size or diameter of the movement is possible while still retaining the advantages of large scale deflection greatly in excess of 90 degrees and easy removability of the moving coil assemblage without disturbing the permanent magnet field structure.

Another object of the invention is to provide a novel and improved instrument movement as above set forth, which is extremely compact in its construction, especially as regards the permanent magnet field structure thereof.

A still further object of the invention is to provide an improved instrument movement in accordance with the foregoing, wherein the permanent magnet field structure is inherently self-shielding, thereby minimizing to the greatest possible extent the existence of stray flux at the exterior of the instrument movement.

Yet another object of the invention is to provide an improved instrument movement having the above advantages and which is extremely sensitive in its response to minute currents and reliable in its operation at all times.

A further object of the invention is to provide an improved electrical instrument movement as above set forth, which moreover has a uniform deflection characteristic so that a uniformly graduated or substantially uniformly graduated scale may be readily used in conjunction with the movable coil system.

A feature of the invention resides in the provision of an electrical instrument movement and field construction having all of the above advantages and which is nevertheless extremely simple, utilizing few components, said movement being relatively economical to fabricate and produce.

Another feature of the invention resides in the provision of an electrical instrument movement as above characterized, which is sturdy in its construction and able to withstand considerable stress and force without the likelihood of failure.

Other features and advantages will hereinafter appear:

In the drawings accompanying this specification, similar characters of reference are used to designate like components throughout the several views, in which:

FIGURE 1 is an axial sectional view through an improved electrical instrument and movement made in accordance with the invention.

FIG. 2 is a transverse sectional view taken on the line 2—2 of FIG. 1.

FIG. 3 is a fragmentary axial sectional view of the magnetic field construction of the instrument movement, taken on the line 3—3 of FIG. 2.

FIG. 4 is a side eelvational view of the permanent magnet energizing means employed in the field construction of the instrument movement.

FIG. 5 is a top plan view of the permanent magnet means shown in FIG. 4.

FIG. 6 is an end elevational view of the permanent magnet means of FIGS. 4 and 5.

FIG. 7 is an end elevational view of the outer pole piece employed in the field structure of the present improved instrument movement.

FIG. 8 is an axial sectional view of the outer pole piece, taken on the line 8—8 of FIG. 7.

Figure 12:
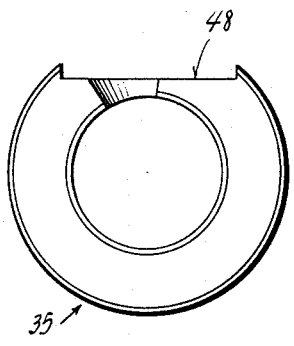
FIG. 12 is an elevational view of the other end of the inner pole piece or core structure.
Figure 10:
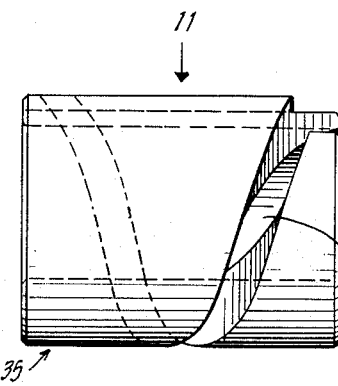
FIG. 10 is a side elevational view of the inner pole or core member, looking in the direction of the arrow 10 of FIG. 9.
Figure 9:
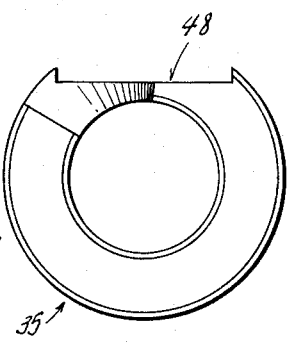
FIG. 9 is an end elevational view of the inner pole piece or core member employed in the field structure of the improved instrument movement.

Referring to FIGS. 1–3, the improved electrical instrument of the present invention comprises a casing 20 of relatively small diameter and appreciable length. For example, the casing 20 may have a diameter of 1 inch and a length of 2½ inches or more. At its front end the casing 20 may carry a transparent window assembly 21, whereas at the other end the casing may be provided with a separable connector fitting assembly indicated generally by the numeral 22.

Within the casing 20 having such relatively small frontal dimensions there is provided by the invention a novel and improved instrument movement which is of extremely compact, simple construction and design so that it may occupy a very small space, while at the same time the said movement retains the advantages of much larger instrument movements and further has certain other advantages which are not found in larger movements. For example, the present instrument movement is so arranged that the moving coil system may indicate through an arc greatly in excess of 90 degrees and virtually as great as 270 degrees.

Moreover, the moving coil assemblage of the instrument movement may be separated and removed from the field structure without disturbing the latter or the magnetic circuit thereof. Thus there is had the benefit of interchangeability of moving coil systems, preassembly of the magnetic field structure without the movable coil assemblage in place, separate testing of the field structure, etc. The field structure, moreover, is so constituted that a uniformly graduated scale is possible in the instrument, for reading the various indications, no portion of such scale being either substantially condensed or expanded. Therefore the instrument may be easily read, and quick and accurate readings may be readily had. Because the field magnet assemblies may be completely fabricated and assembled as separate units, testing and adjusting of the same may be quickly and effectively carried out, and various coil assemblies may be utilized with a given field structure. Therefore from the standpoint of the manufacturer, this improved organization results in a more rugged and reliable, higher quality instrument as well as in a desirable economy in the manufacture.

In addition to the above advantages, the instrument movement of the present invention has the further advantage that relatively few, simple components may be utilized, and that the permanent magnet field structure is inherently self-shielding thereby minimizing to the greatest possible extent the existence of stray flux in the area surrounding the instrument movement.

Referring particularly to FIG. 1, the instrument movement is seen to comprise a compact and small permanent magnet field structure indicated generally by the numeral 24, disposed intermediate the ends of the casing 20 and closely adjacent the interior walls thereof, together with a movable coil assemblage indicated generally by the numeral 25.

The assemblage 25 includes a rectangular driving coil 26 carried by a shaft 27, the latter having the usual bearing pivots at its ends which are supported by bridges 28 and 29. Extending forwardly of the shaft 27 is an extension 31 provided with a pointer 32, which latter is adapted to travel over a scale (not shown) having graduations extending through a relatively great arc slightly less than 270 degrees.

By the present invention the field structure 24 is constituted and arranged in a novel manner so that it greatly minimizes stray magnetic flux, permits large scale deflection of the movable coil assemblage 25 and also permits such assemblage to be completely removed from the field structure without dismantling the same or disturbing the magnetic circuit thereof.

Moreover, the field structure 24 is constituted of relatively few components, and is extremely rugged in its construction, providing at the same time a uniform flux or field with which the driving coil 26 may react to provide great sensitivity and high accuracy in the readings.

Referring to FIGS. 2 through 11, the said novel field structure comprises essentially a pair of spaced, annular poles 34 and 35 constituted of magnetic material, said poles being disposed concentrically one within the other. The inner annular pole 35 constitutes a core member adapted to be linked by the movable coil 26 of the assemblage 25. Also, the inner pole piece or core member 35 has a diagonal cut 37 extending entirely through it between its opposite ends 38 and 39. As illustrated herein, the diagonal cut 37 is a spiral which makes one complete turn about the axis of the inner pole or core member 35.

As shown, the outer and inner pole pieces 34 and 35 are of cylindrical construction, having appreciable thickness and also appreciable length.

Referring now particularly to FIGS. 2 and 3, the field structure 24 is seen to further comprise a relatively small yet powerful permanent magnet 41 which is in the form of a thin slab having appreciable width and length. The exact shape of the permanent magnet 41 is clearly shown in FIGS. 4, 5 and 6. The magnet 41 is disposed in the space between the outer and inner poles 34 and 35 at a point removed from the center portion of the diagonal cut 37 of the inner pole 35. Because of the slab-like shape of the magnet 41, it has expansive opposite faces or surfaces 43 and 44, and such faces are engaged respectively with the outer and inner annular poles of the field structure, thereby to magnetize such poles with the indicated polarities. For example, as seen in FIGS. 2, 3, 4 and 6, the permanent magnet 41 is magnetized so that one of the expansive surfaces, that indicated by the numeral 43, becomes a south pole, and the other expansive surface 44 is a north pole. Thus, the outer annular pole 34 will be polarized "south" whereas the inner annular pole 35 will be polarized "north."

Further, in accordance with the invention, I provide recesses in the outer and inner annular poles, by which the permanent magnet 41 may be seated and accurately positioned, thereby to reduce leakage flux at the poles and provide for a more precise construction, and one which is extremely rugged and able to withstand considerable stress and disruptive forces.

Referring to FIGS. 7 and 8, the outer annular pole 34 has an internal recess 46 extending for its full axial length, said recess having a flat bottom as shown. Also, the inner annular core 35 is provided with an external recess 48, which is disposed opposite to the recess 46 in the outer pole 34. The recess 48 is also provided with a flat bottom surface, and the permanent magnet 41 is preferably so machined or fabricated that it closely fits in the recesses 46 and 48, thereby accurately positioning the outer and inner poles with respect to each other. Any suitable means for securing the poles and permanent magnet together may be utilized. For example, these components may be secured to each other by soft solder which, together with the interfitting of the parts, results in a sturdy field assemblage.

By virtue of the diagonal or spiral cut 37 making one complete turn, the ends of the cut will extend past the ends of the permanent magnet 41. In order to prevent the magnet from overlapping the ends of the cut, thereby to defeat removal of the coil assemblage from the field structure, one pair of opposite diagonal corners of the magnet is removed, as indicated by the numerals 50 and 51 in FIG. 5.

Figure 11:
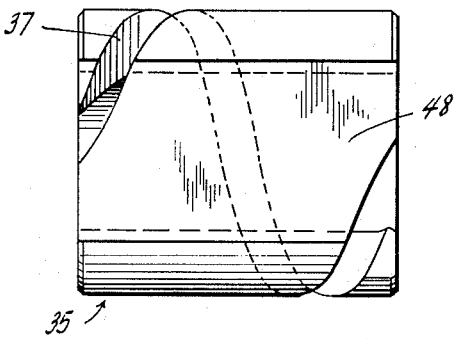
FIG. 11 is a top plan view of the inner pole piece or core member of the field structure, looking in the direction of the arrow 11 of FIG. 10.

Such corners if not removed would be disposed at and would overlap the ends of the spiral cut 37, as may be readily observed from an inspection of FIG. 11 wherein the recess 48 of the inner core member 35 is clearly shown.

Referring to FIGS. 2 and 3 it will now be understood that the movable coil assemblage 25 including the driving coil 26 which links the inner pole piece 35 may be completely removed from the field structure 24 after the coil assemblage has been freed of its bearings. It is merely necessary to slide one end of the coil 26 along the diagonal slot or cut 37 in the inner pole piece 35, tilting and turning the coil assemblage slightly as required, whereby the assemblage may be completely removed from the field structure without disturbing the latter in the least or the magnetic circuit thereof. Such construction therefore permits the pole pieces and permanent magnet to be permanently soldered to each other and made into a rigid and sturdy unit which will retain at all times to a maximum degree the magnetism or flux.

Moreover, by virtue of the north and south poles of the permanent magnet 41 being entirely enclosed or surrounded and engaged with the outer and inner pole pieces 34 and 35 respectively, most of the flux produced by the permanent magnet will exist in the air gap or space between the annular pole pieces, and a minimum amount of leakage flux will be manifested at the ends of the field structure 24. Such leakage flux will be weak at the best, and in the area surrounding the periphery of the outer annular pole 34 but very little leakage flux will be found to exist. Accordingly, the field structure as provided by the invention is inherently self-shielding, and minimizes stray flux in the area surrounding the instrument movement. Where the casing 20 is constituted of steel or other magnetic material, such leakage flux will be further greatly minimized and virtually completely contained within the casing. Thus, adjoining instruments would not be adversely affected because of the permanent magnet field structure 24 of the present improved instrument movement.

By virtue of the spiral slot 37 making one complete turn about the axis of the inner pole piece 35, the flux density in the air gap between the pole pieces will be quite uniform as regards the one side of the driving coil 26 which travels in such air gap. While for different positions of the coil 26 the flux pattern may vary, the total flux which the coil cuts or with which it reacts will remain substantially constant for all deflections, and accordingly uniformity in the deflection of the movable coil system may be readily had. The single, small sized magnet 41 and small coil 26 moreover permit movement of the movable coil assemblage through an arc of virtually 270 degrees.

By virtue of the slab-like construction of the magnet 41 it may have an appreciably great force when magnetized in such a manner that its expansive sides 43 and 44 constitute the poles of the magnet. Accordingly, an appreciable flux density may be produced in the air gap between the outer and inner poles 34 and 35, with the result that the instrument movement has great sensitivity.

Referring again to FIG. 1 it will be seen that the bearing bridges 28 and 29 may be advantageously carried by studs 53 and 54 threaded into the ends of the outer annular pole piece 34. Also, as seen in FIG. 3, a pair of mounting studs 56 may be advantageously threaded into the one end of the outer annular pole piece 34, for attaching the instrument movement of a transverse wall or other suitable support within the casing 20.

It will now be understood that, in accordance with the invention and the foregoing construction I have provided an extremely compact and small, simple and advantageous instrument movement which has numerous advantages. In addition to its small diameter whereby the instrument movement may be completely contained within a one-inch diameter cylindrical casing, the structure as provided by the invention enables the movable coil assemblage to be completely removed from the field unit without dismantling the latter or disturbing in any way the magnetic circuit thereof. A uniform scale characteristic is obtained over a large range of substantially 270 degrees, together with great sensitivity by the compact and effective magnetic field structure as provided herein. Moreover, the existence of a stray flux is greatly minimized by the inherent self-shileding property of the field structure due to the interposition of the permanent magnet 41 between the outer and inner pole pieces 34 and 35. By recessing the outer and inner pole pieces, a further decrease of stray flux and saving of space is accomplished, together with increased rigidity and ruggedness whereby the instrument movement is enabled to withstand considerable forces without failure of the field structure.

Variations and modifications may be made within the scope of the claims and portions of the improvements may be used without others.

I claim:
1. In an electrical instrument, a self-shielding magnet and pole structure comprising a pair of spaced annular poles of magnetic material disposed concentrically one within the other, the inner annular pole constituting a core adapted to be linked by a movable coil, said inner pole having a diagonal cut extending entirely through it between its opposite ends and the outer pole having cylindrical inner and outer walls concentric with each other; and a permanent magnet disposed in the space between the poles at a point removed from the center of the said cut, said magnet having its north pole engaged with one annular pole and its south pole engaged with the other and the said diagonal cut in the inner pole making a complete turn around the axis of the pole and extending through an arc of substantially 360 degrees, said permanent magnet extending axially between and completely to the ends of the diagonal cut, and comprises a thin slab of magnetic material having appreciable width and having parallel longitudinal side edges and a length of the same order of magnitude as the axial length of the inner and outer poles, said magnet being devoid of one pair of diagonally opposite corners to prevent it from jutting into the said diagonal cut at the ends thereof.

2. The invention as defined in claim 1, in which the outer annular pole has an internal, axially extending recess in which the said permanent magnet is disposed.

3. The invention as defined in claim 1, in which the inner annular pole has an external, axially extending recess in which the said permanent magnet is disposed.

4. The invention as defined in claim 1, in which the outer annular pole has an internal, axially extending recess, in which the inner annular pole has an external, axially extending recess disposed opposite the recess of the outer pole, said permanent magnet being disposed in the said recesses.

References Cited in the file of this patent
UNITED STATES PATENTS

| | | |
|---|---|---|
| 824,696 | Lehr | June 26, 1906 |
| 2,586,831 | Knudsen | Feb. 26, 1952 |
| 2,848,662 | Barry et al. | Aug. 19, 1958 |